United States Patent [19]

Lüssling et al.

[11] 3,923,819

[45] Dec. 2, 1975

[54] CATALYST FOR THE PRODUCTION OF AROMATIC OR HETERO-AROMATIC NITRILES

[75] Inventors: Theodor Lüssling; Hans Schaefer, both of Grossauheim; Wolfgang Weigert, Offenbach, all of Germany

[73] Assignee: Deutsche Gold- und Silber-Scheideanstalt vormals Roessler, Germany

[22] Filed: June 22, 1973

[21] Appl. No.: 372,673

Related U.S. Application Data

[62] Division of Ser. No. 74,829, Sept. 23, 1970, abandoned.

[30] Foreign Application Priority Data

Sept. 26, 1969 Germany.............................. 1948715

[52] U.S. Cl.... 260/294.9; 260/283 CN; 260/465 C; 252/456; 252/470

[51] Int. Cl.[2]........................................ C07D 213/57
[58] Field of Search ....... 260/294.9, 465 C, 283 CN

[56] References Cited
UNITED STATES PATENTS

| | | | |
|---|---|---|---|
| 2,816,908 | 12/1957 | Aries............................... | 260/465 C |
| 3,297,587 | 1/1967 | Scherhag et al. ................ | 260/294.9 |

*Primary Examiner*—Alan L. Rotman
*Attorney, Agent, or Firm*—Cushman, Darby & Cushman

[57] ABSTRACT

A catalyst useful in preparing nitriles from alkyl substituted aromatic and heteroaromatic hydrocarbons comprises a mixture of antimony oxide and tungsten oxide which have been pretreated by heating from 650° to 1100° C. Compounds of manganese, chromium, iron, cobalt, nickel, copper or, preferably, vanadium can also be present.

19 Claims, No Drawings

CATALYST FOR THE PRODUCTION OF
AROMATIC OR HETERO-AROMATIC NITRILES

This is a division of application Ser. No. 74,829 filed Sept. 23, 1970, and now abandoned.

The present invention is directed to a catalyst useful in the reaction of alkyl substituted aromatic and heteroaromatic hydrocarbons with ammonia and oxygen to from nitriles.

Several processes for the production of aromatic nitriles from the corresponding alkyl aromatic compounds are known which are characterized by various reaction conditions, especially by different catalysts. For the catalysts there are primarily used elements such as antimony, vanadium, molybdenum, tungsten, chromium and manganese. They are particularly employed as oxides, for the most part in mixtures or, in a given case, in compounds with each other and for the most part are used on carriers based on silica or alumina.

Only a few of the known processes and catalysts which are suited generally for the transforming of the alkyl substituted aromatic and heteroaromatic compounds to the corresponding nitriles are also of industrial significance by providing high space-time-yields and simultaneously showing good selectivity. Usually selectivity decreases with increasing transconversion and along with it, the yield of the desired nitrile decreases and the portion of by products increases correspondingly.

It is particularly known to use as a catalyst compounds of antimony and vanadium and a carrier (German Auslegeschrift Pat. No. 1,286,002 and German Auslegeschrift Pat. No. 1,290,125). These processes, however, are not generally usable.

According to our own experience these processes, for example, in the reaction of o-xylene only form o-phthalodinitrile to a small extent, but instead from large amounts of phthalimide. For another process a similar catalyst was used with the addition of alkali oxide, Netherlands application No. 6,810,189. This process makes it possible to obtain o-phthalodinitrile in favorable yield, but it requires a large excess of ammonia.

It is also known to employ aluminum oxide with vanadium oxide-chromium oxide mixtures as catalysts, German Auslegeschrift, Pat. No. 1,172,253. This process is especially directed to the production of o-phthalodinitrile. This disadvantages of this process are that the catalyst provided is only producible with difficulty with reproducible results and that its preparation requires great exactness, especially in regard to the selection of an aluminum oxide of suitable quality.

It is also known to use a catalyst produced essentially from compounds of tungsten, in a given case with addition of compounds of various other metals (German Auslegeschrift Pat. No. 1,127,012. This process is selective for the conversion of various hydrocarbons. However, there are obtained only low space-time-yields.

It has now been found that a catalyst for the reaction of alkyl substituted aromatic and heteroaromatic hydrocarbons with ammonia and oxygen to form the corresponding nitriles can be made from mixtures of antimony oxide and tungsten oxide, which have been heated to 650° to 1100° C. in the presence of oxygen, in a given case on a carrier.

The catalyst of the invention differs advantageously from the catalysts used in known processes by a high selectivity; the amount of byproducts is small in the production of the nitrile. It is very remarkable that the catalyst can be used successfully not only for the transformation of individual compounds, but generally with alkyl substituted aromatic and heteroaromatic hydrocarbons leads to the formation of nitriles in good yields. In the transformation of o-xylene or o-toluonitrile there is formed o-phthalodonitrile in very good yields. Phthalimide on the contrary, is formed in only slight amounts which often are scarcely detectable.

By the addition of manganese, chromium, iron, cobalt, nickel, copper and preferably vanadium, either individually or, in a given case, several of them together the activity of the catalyst and also the space-time-yield can be very greatly increased.

For the production of the catalyst of the invention there is heated a mixture of antimony oxide with tungsten oxide for 1 to 50 hours, preferably 5 to 20 hours in the presence of oxygen at temperature of 650° to 1100° C., preferably 700° to 1000°C., especially preferred being temperatures of 800° to 1000° C.

The mixtures are so chosen that the atomic portion of antimony is greater than that of tungsten, or in a given case, the tungsten and vanadium together. The atomic ratio of antimony to tungsten or antimony to tungten and vanadium lies between 1.1 to 1 and 50 to 1, preferably between 1.1 to 1 and 25 to 1. The atomic ratio of tungsten to vanadium lies between 0.25 to 1 and 20 to 1, preferably between 0.5 to 1 and 10 to 1. As atomic ratios of antimony to manganese, chromium, iron, cobalt, nickel and copper individually or together there can be used ratios of 4 to 1 up to 20 to 1, preferably from 5 to 1 up to 10 to 1, most preferably from 8 to 1 up to 10 to 1. However, in no case should the atomic portion of manganese, chromium, iron, cobalt, nickel or copper individually or together exceed the atomic portion of tungensten or when tungsten and vanadium are employed the atomic portion of tungsten and vanadium together.

For the preparation of the antimony-tungsten mixtures one can proceed from antimony oxides and tungsten oxides, or from the elements, or any compounds of antimony and tungsten which can be converted into the oxides, as for example ammonium salts of tungstic acid, or halogen compounds, or organic compounds of antimony and tungsten.

Vanadium, manganese, chromium, iron, cobalt, nickel and copper are added, in a given case, likewise as oxides e.g. vanadium pentoxide, manganese dioxide, chromium trioxide, chromic oxide, ferrous oxide, ferric oxide, cobaltous oxide, cobaltic oxide, nickel monoxide or cupric oxide or as compounds which can be converted to oxides, e.g. ammonium metavanadate, manganous nitrate, manganous oxalate, manganous carbonate, ammonium chromate, chromium nitrate, ferric nitrate, cobaltous nitrate, cobaltic acetate, cobaltous carbonate, cupric nitrate, nickelous nitrate, nickel oxalate.

A preferred method for the preparation of the antimony-tungsten mixture is to treat antimony or antimony trioxide with concentrated nitric acid, separate the hydrated antimony oxide, disperse it in water and mix with ammonium para tungstate in the desired proportions and finally evaporate the mixture to dryness. In a given case the other elements are added with the ammonium para tungstate, for example as ammonium metavanadate, magnanese nitrate, ammonium chromate, ferric nitrate, cobalt nitrate, nickel nitrate or copper nitrate. Advantageously, the thus prepared catalyst mixture is first heated to a temperature between 250° and 450° C., especially at about 300° C. for 20 to 60 minutes in the presence of oxygen and then is heated further to 650° to 1100° C.

The catalyst can be used as such, or can be used on a carrier and/or mixed with a carrier. As carriers, for example, there can be used alumina or titanium dioxide. The catalysts are suitable for use in fixed beds as well as in fluidized beds and accordingly can be employed, for example, in the form of pellets or in granular form.

The reaction of alkyl substituted aromatics or heteroaromatic hydrocarbons with ammonium and oxygen to form the corresponding nitriles with the use of the catalyst of the present invention takes place in the usual manner in the gas phase. A wide latitude can be used in the selection of the reaction conditions. The reaction is preferably carried out without the use of extra pressure or with low superatmospheric pressures up to 3 atmospheres and at temperatures between 250° and 600° C., preferably 350° to 550° C. The pressure, however, can vary from 1 to 3 atmospheres. The proportions of organic reactant to ammonia to oxygen can vary within wide boundaries. Stoichiometric amounts can be employed. Expediently, however, ammonia is used in twice to five times the stoichiometric amount in relation to the aromatic hydrocarbon. Oxygen can be used in an amount up to one hundred times the stoichiometric amount in relation to the hydrocarbon, depending on the reaction conditions. The gaseous mixture can be diluted with inert gases such as nitrogen, carbon dioxide and/or steam, for example. Especially air can be employed instead of pure oxygen. The concentration of the hydrocarbon in the gaseous mixture preferably amounts to 0.5 to 10 volume percent. The residence time is dependent upon the remaining reaction conditions. Generally it is between 0.1 and 20, especially between 0.3 land 10 seconds.

In the subsequent examples the terminology has the following mean $$\text{Conversion} = \frac{\text{Moles of converted hydrocarbon}}{\text{Moles of added hydrocarbon}} \times 100\ (\%)$$

$$\text{Yield} = \frac{\text{Moles of nitrile produced}}{\text{Moles of added hydrocarbon}} \times 100\ (\%)$$

$$\text{Space-Time-Yield} = \frac{\text{Amount of nitrile produced/time}}{\text{Bulk volume of the catalyst}} \left(\frac{\text{Grams}}{\text{Liters} \times \text{Hours}}\right)$$

$$\text{Residence Time} = \frac{\text{Bulk volume of catalyst}}{\text{Gas volume passed through*/time}} \text{(Seconds)}$$

*Volume based on the conversion temperature.

As alkyl substituted aromatic or heteroaromatic compounds there can be used for example, alkylbenzene, alkyl cyanobenzene, alkylpyridine, alkyl quinoline, alkyl naphthalene, chloroalkylbenzene, e.g. o-xylene, m-xylene, p-xylene, toluene, o-toluonitrile, α-picoline, β-picoline, γ-picoline, 2,3-dimethyl pyridine, 2,4-dimethyl pyridine, 2,5-dimethyl pyridine, 2,6-dimethyl pyridine, 3,4-dimethyl pyridine, 2-ethyl pyridine, 2-methyl-5-ethyl pyridine, ethylbenzene, 1-methyl naphthalene, 2-methyl naphthalene, 2-methyl quinoline, 3-methyl quinoline, 4-methyl quinoline, 5-methyl quinoline, 1,8-diethyl naphthalene, mesitylene, 2,6-dichlorotoluene, butylbenzene, 1,2,4-trimethyl benzene, p-cymene, 2-chlorotoluene and 4-chlorotoluene.

EXAMPLE 1

243.5 grams of powdered antimony were introduced into 1050 ml. of 65 percent nitric acid whose temperature was held at 750° C. The mixture was held at the boiling point until no more nitrous gases escaped. The precipitate of hydrated antimony oxide formed was separated, washed with water and dispersed in 150 ml. of water. There were added 132.7 grams of finely divided ammonium para tungstate $((NH_4)_{10} W_{12}O_{41})$, the mixture evaporated to dryness and heated in an air stream at 300° C. for 30 minutes. The catalyst composition thus prepared, in which the antimony and tungsten were present in the atomic ratio of 4 to 1 was formed into tablets.

The tablets were heated in a furnace for 16 hours in an air stream at 800° C., inside the furnace, cooled to 400° C. within 5 hours and then, outside the furnace, cooled to room temperature and subsequently reduced to a particle size of 0.6 to 1.0 mm.

There was poured into a fixed bed reacter of alloy steel, 11 mm. internal diameter and 200 mm. long, 15 ml. of this catalyst material. Through the reactor which was heated by means of a salt melt to 500° C. there was led a gaseous mixture containing 0.5 volume percent o-xylene, 5 volume percent ammonia and 94.5 volume percent air. The residence time was 1.8 seconds. The o-xylene was completely reacted. The yields were 56 percent of o-phthalodinitrile and 36 percent of o-toluonitrile. The share of phthalimide was under 0.2 percent.

EXAMPLE 2

This example was carried out as in example 1. By way of comparison, however, the catalyst material was heated for 16 hours only at 500° C. The temperature of the salt melt was 460° C., the residence time 1.9 seconds. The o-xylene was completely reacted. The yields were 29 percent of o-phthalodinitrile, 37 percent o-toluonitrile and 1.8 percent phthalimide.

EXAMPLE 3

The procedure was as in example 1. However, 170.5 grams of antimony were dissolved in 730 ml. of nitric acid. The precipitate of hydrated antimony oxide was dispersed in 150 ml. of water and to this mixture were added 88.7 grams of ammonium para tungstate as well as 40.9 grams of ammonium metavanadate $(NH_4VO_3)$. The atomic ratio of antimony to tungsten to vanadium was 4 to 1 to 1. It was further worked up as in example 1. However, the gas mixture was reacted at a temperature of the salt melt of 460° C. and a residence time of 1.9 seconds. The o-xylene conversion was 100 percent. The yields were 70 percent of o-phthalodinitrile, 7.6 percent of o-toluonitrile and 8.7 percent of phthalimide.

EXAMPLE 4

There was used the catalyst prepared in example 3 and there was brought-to reaction on this at 490° C. and a residence time of 1.8 seconds a gaseous mixture of 1 volume percent toluene, 5 volume percent ammonia and 94 volume percent air. The conversion of toluene was 100 percent. The yield of benzonitrile 82 percent.

EXAMPLE 5

There was used the catalyst prepared in example 3 and there was brought to reaction on this at 480° C. and a residence time of 1.8 seconds, a gaseous mixture of 0.5 volume percent o-toluonitrile, 5 volume percent ammonia and 94.5 volume percent of air. The conversion of o-toluonitrile amounted to 93 percent: the yields were 63 percent of o-phthalodinitrile and 5 percent of phthalimide.

EXAMPLE 6

There was used the catalyst prepared in example 3 and there was brought to reaction on this at 430° C. and a residence time of 2.0 seconds, a gaseous mixture consisting of 0.5 volume percent β-picoline, 5 volume percent ammonia and 94.5 volume percent air. The conversion of the β-picoline was 90 percent; the yield of nicotinonitrile was 72 percent.

EXAMPLE 7

243.5 grams of powdered antimony were introduced into 1000 ml. of 65 percent nitric acid which was held at 75° C. The mixture was heated to boiling until no more nitrous gases escaped. The precipitate of hydrated antimony oxide formed was separated, washed with water and dispersed in 200 ml. of water. There were added 126.7 grams of ammonium para tungstate and 62.8 grams of manganese (II) nitrate tetrahydrate $(Mn(NO_3)_2 \cdot 4H_2O)$, the mixture was evaporated to dryness and then heated in an airstream at 300° C. for 30 minutes. The catalyst material thus prepared in which the antimony, tungsten and manganese were present in the atomic ratios of 8 to 2 to 1 was formed into tablets. The tablets were heated in an airstream at 800° C. for 16 hours. The catalyst was further processed as in example 1. The catalyst was employed with a gas mixture of 0.5 volume percent o-xylene, 5 volume percent ammonia and 94.5 volume percent air. The temperature of the salt melt was 460° C., the residence time 1.9 seconds. The o-xylene was completely reacted. The yields were 66 percent of o-phthalodinitrile, 8.5 percent of o-toluonitrile and 6.1 percent of phthalimide.

EXAMPLE 8

A catalyst was prepared as in example 7 and reacted at 500° C. and a residence time of 0.9 seconds with a gaseous mixture of 1 volume percent o-xylene, 10 volume percent ammonia and 89 volume percent air. The conversion of o-xylene was 100 percent, the space-time-yield of o-phthalodinitrile 49 grams/liter x hour. The yields were 59 percent of o-phthalodinitrile, 18 percent of o-toluonitrile and 2.7 percent of phthalimide.

EXAMPLE 9

The procedure was as in example 7 except that instead of manganese nitrate there were added 38.0 grams of ammonium chromate $((NH_4)_2 CrO_4)$. The atomic ratio of antimony to tungsten to chromium was 8 to 2 to 1. The catalyst was used at 480° C. and a residence time of 1.8 seconds with a gas mixture of 0.5 volume percent o-xylene, 5 volume percent ammonia and 94.5 volume percent of air. The conversion of o-xylene amounted to 100 percent. The yields were 58 percent of o-phthalodinitrile, 14 percent of o-toluonitrile and 4.1 percent of phthalimide.

EXAMPLE 10

The procedure was as in example 7. Additionally there was added 58.5 grams of ammonium metavanadate in making the catalyst. The atomic ratios of antimony to tungsten to manganese to vanadium were 8 to 2 to 1 to 2. The catalyst was used to react at 480° C. and a residence time of 0.92 seconds with a gaseous mixture of 1 volume percent o-xylene, 10 volume percent ammonia and 89 volume percent of air. The conversion of o-xylene was 100 percent, the space-time-yield of o-phthalodinitrile was 51 grams/liter x hour. The yields were 61 percent of o-phthalodinitrile, 13 percent of o-toluonitrile and 6 percent of phthalimide.

EXAMPLE 11

243.5 grams of powdered antimony were introduced into 1000 ml. of 65 percent nitric acid which was held at 75° C. The mixture was heated to boiling until no more nitrous gases escaped. The precipitate formed was separated, washed with water and dispersed in 200 ml. of water. There were added 125 grams of tungstic acid $(H_2 WO_4)$ and 72.8 grams of nickel (II) nitrate hexahydrate $(Ni(NO_3)_2 \cdot 6 H_2O)$. The mixture was worked up as in example 7. The atomic ratio of antimony to tungsten to nickel was 8 to 2 to 1. The catalyst was employed with a gaseous mixture of 1 volume percent o-xylene, 10 volume percent ammonia and 89 volume percent of air. The temperature of the salt bath was 500° C. and the residence time was 0.90 second. The conversion of o-xylene amounted to 100 percent, the space-time-yield of o-phthalodinitrile 42 g/l. h. The yields were 50 percent of o-phthalodinitrile, 40 percent of o-toluonitrile and 0.9 percent phthalimide.

EXAMPLE 12

The catalyst was prepared according to example 11, except that instead of nickel nitrate there were added 101.0 grams of iron (III) nitrate monahydrate $(Fe(NO_3)_3 \cdot 9 H_2O)$. The atomic ratios of antimony to tungsten to iron were 8 to 2 to 1. Using this catalyst there were reacted at 470°C. and a residence time of 0.94 seconds a gaseous mixture of 1 volume percent o-xylene, 10 volume percent ammonia and 89 volume percent air. The conversion of o-xylene was 100 percent, the space-time-yield of o-phthalodinitrile 48 g/l. x h. The yields were 58 percent of o-phthalodinitrile, 12 percent of o-toluonitrile and 5.7 percent of phthalimide.

EXAMPLE 13

The catalyst was prepared according to example 11 except that instead of nickel nitrate there were added 45.5 grams of vanadium pentoxide and 72.7 grams of cobalt (II) nitrate hexahydrate $(Co(NO_3)_2 \cdot 6 H_2O)$.

The atomic ratios of antimony to tungsten to vanadium to cobalt were 8 to 2 to 2 to 1. Using this catalyst there was reacted at 500° C. and a residence time of 0.90 seconds a gaseous mixture of 1 volume percent o-xylene, 10 volume percent ammonia, and 89 volume percent air. The conversion of o-xylene was 100 percent, the space-time-yield 45 g/l x h. The yields were 54 percent of o-phthalodinitrile, 7.1 percent of o-toluonitrile and 4.2 percent of phthalimide.

EXAMPLE 14

The catalyst was prepared according to example 11, except that instead of nickel nitrate there were added 45.5 grams of vanadium pentoxide and 60.4 grams of copper (II) nitrate trihydrate ($Cu(NO_3)_2 \cdot 3 H_2O$). The atomic ratios of antimony to tungsten to vanadium to copper were 8 to 2 to 2 to 1. Using this catalyst there were reacted at 445° C. and a residence time of 1.9 seconds a gaseous mixture of 0.5 volume percent o-xylene, 5 volume percent ammonia and 94.5 volume percent air. The conversion of o-xylene was 100 percent. The yields were 58 percent of o-phthalodinitrile, 12 percent o-toluonitrile and 5.1 percent phthalimide.

EXAMPLE 15

350 grams of antimony trioxide ($Sb_2O_3$) were heated with stirring, with 800 ml. of 65 percent nitric acid until nitrous gases no longer escaped. The precipitate formed was separated, washed with water and dispersed in 400 ml. of water. There were added 70.2 grams of ammonium metavanadate and 152.2 grams of ammonium para tungstate. The mixture was brought to dryness and then heated for 30 minutes in an airstream at 300° C. The catalyst material thus prepared in which the atomic ratios of antimony to tungsten to vanadium were 4 to 1 to 1 was after the addition of 3 weight percent of graphite tabletted and finally heated for 16 hours in an airstream at 770° C. It was further processed as in example 1, using a gaseous mixture of 1 volume percent o-xylene, 10 volume percent ammonia and 89 volume percent air. The temperature of the salt melt was 470°. There were fed in hourly 1.94 mols of o-xylene per liter bulk volume of catalyst. The conversion of o-xylene was 100 percent, the time yield of o-phthalodinitrile 169 g/l x h. The yields were 68 percent of o-phthalodinitrile, 13 percent of o-toluonitrile and 3.5 percent phthalimide.

EXAMPLE 16

There was employed a catalyst prepared according to example 15 and there was reacted on the catalyst at a salt bath temperature of 480° C. a gaseous mixture of 1 volume percent o-xylene, 10 volume percent ammonia, 74 volume percent air and 15 volume percent nitrogen. There were fed 1.94 mols of o-xylene/l x h. The conversion of o-xylene was 100 percent, the space-time-yield of o-phthalodinitrile 184 g/l × h. The yields were 74 percent of o-phthalodinitrile, 13 percent of toluonitrile and 3.6 percent phthalimide.

EXAMPLE 17

291.6 grams of antimony trioxide with stirring were heated with 700 ml. of 65 percent nitric acid at boiling until nitrous gases no longer escaped. The precipitate formed was separated, washed with water and dispersed in 2 liters of water. There were added 58.5 grams of ammonium metavanadate, 126.7 grams of ammonium para tungstate and 312.5 grams of commercial titanium dioxide (type P 25 of Degussa). The mixture was heated to boiling evaporated to dryness and heated for 30 minutes in an airstream at 450° C. The thus prepared catalyst material in which the antimony, tungsten and vanadium were in the atomic ratios of 4 to 1 to 1 was, after addition of 3 weight percent of graphite, tabletted and subsequently heated in an airstream for 2 hours at 500°C., 30 minutes at 650° and 16 hours at 770° C. It was further processed as in example 1 except that there was used a gaseous mixture of 1 volume percent o-xylene, 10 volume percent ammonia and 89 volume percent of air. The temperature of the salt melt was 458° C. There were fed hourly 1.94 mols of o-xylene per liter bulk volume of catalyst. The conversion of o-xylene was 100 percent, the space-time-yield of o-phthalodinitrile 166 g/l × h. The yields were 67 percent of o-phthalodinitrile, 17 percent o-toluonitrile and 2.5 percent phthalimide.

EXAMPLE 18

There was employed a catalyst prepared as in example 17 and on this there was reacted at a salt bath temperature of 463° C. a gaseous mixture of 1 volume percent o-xylene, 10 volume percent ammonia, 30 volume percent of air and 59 volume percent nitrogen. There were fed 1.94 mols of o-xylene/l × h. The conversion of o-xylene was 96 percent, the space-time-yield of phthalodinitrile 169 grams/l × h. The yields 68 percent of o-phthalodinitrile, 28 percent o-toluonitrile and 1.4 percent phthalimide.

EXAMPLE 19

The catalyst was produced as in example 11, except that there was also added 45.5 grams of vanadium pentoxide. The thus prepared catalyst contained antimony, tungsten, vanadium and nickel in the atomic ratios of 8 to 2 to 2 to 1. This catalyst was used in the reaction at 500° C. and a residence time of 0.90 seconds of a gaseous mixture of 1 volume percent of o-xylene, 10 volume percent ammonia, and 89 percent air. The conversion of o-xylene was 100 percent, the space-time-yield of o-phthalodinitrile was 53 grams/l × h. The yields were 64 percent of o-phthalodinitrile, 9.9 percent of o-toluonitrile and 4.7 percent of phthalimide.

What is claimed is:

1. A process for the production of an aromatic or heterocyclic nitrile from a mixture of an alkyl substituted aromatic or heteroaromatic hydrocarbon selected from the group consisting of lower alkylbenzene, lower alkyl naphthalene, lower alkyl cyanobenzene lower alkyl chlorobenzene, lower alkyl pyridine and lower alkyl quinoline ammonia and oxygen consisting essentially of contacting said mixture in gaseous form with a catalyst consisting essentially of the product prepared by heating to from 650° to 1100°C. a member of the group consisting of (a) a mixture consisting of antimony oxide and tungsten oxide wherein the atomic ratio of antimony to tungsten is from 1.1 to 1 up to 50 to 1, (b) a mixture consisting of antimony oxide, tungsten oxide and vanadium oxide wherein the atomic ratio of antimony to tungsten and vanadium combined is from 1.1 to 1 up to 50 to 1 and the atomic ratio of tungsten to vanadium is from 0.25 to 1 up to 20 to 1, (c) a mixture consisting of antimony oxide, tungsten oxide and at least one other element of the group consisting of manganese, chromium, iron, cobalt, nickel and copper wherein the atomic ratio of antimony to tungsten is from 1.1 to 1 up to 50 to 1 and the atomic ratio of antimony to the total of manganese, chromium, iron, cobalt, nickel and copper is from 4 to 1 up to 20 to 1 with the atomic portion of the total of said manganese, chromium, iron, cobalt, nickel and copper not exceeding the atomic portion of tungsten and (d) a mixture consisting of antimony oxide, tungsten oxide, vanadium oxide and at least one element of the group consisting of manganese, chromium, iron, cobalt, nickel and copper wherein the atomic ratio of antimony to tungsten and vanadium combined is from 1.1 to 1 up to 50 to 1, the atomic ratio of tungsten to vanadium is from 0.25 to 1 up to 20 to 1 and the atomic ratio of antimony to the total of manganese, chromium, iron, cobalt, nickel and copper is from 4 to 1 up to 20 to 1 with the atomic portion of the total of said manganese, chromium, iron, cobalt, nickel and copper not exceeding the combined atomic portion of tungsten and vanadium.

2. A process according to claim 1 wherein said nitrile is produced by heating at 250° to 600°C.

3. A process according to claim 2 wherein the aromatic hydrocarbon or heteroaromatic hydrocarbon selected from the group consisting of toluene, o-xylene, o-toluonitrile and β-picoline.

4. A process according to claim 2 wherein the catalyst consists of antimony and tungsten oxides.

5. A process according to claim 1 wherein the catalyst includes an oxide of an element selected from the group consisting of manganese, chromium, iron, cobalt, nickel, copper and vanadium.

6. A process according to claim 5 wherein said element is vanadium.

7. A process according to claim 5 wherein the element is other than vanadium and it is present in no greater portion than that of the tungsten.

8. A process according to claim 5 wherein there are present in the catalyst both vanadium oxide and the oxide of one or several of the elements of said group, and wherein said another elements are not present in an atomic portion greater than the total of tungsten and vanadium.

9. A process according to claim 1 wherein the catalyst is (a).

10. A process according to claim 1 wherein the catalyst is (b).

11. A process according to claim 1 wherein the catalyst is (c).

12. A process according to claim 1 wherein the catalyst is (d).

13. A process according to claim 1 wherein the alkyl substituted aromatic or heteroaromatic hydrocarbon is lower alkyl benzene.

14. A process according to claim 13 wherein the alkyl benzene is toluene.

15. A process according to claim 13 wherein the alkyl benzene is toluene.

16. A process according to claim 13 wherein the alkyl substituted aromatic or heteroaromatic hydrocarbon is lower alkyl naphthalene.

17. A process according to claim 13 wherein the alkyl substituted aromatic or heteroaromatic is lower alkyl cyanobenzene.

18. A process according to claim 17 wherein the cyanobenzene is o-toluonitrile.

19. A process according to claim 13 wherein the alkyl substituted aromatic or heteroaromatic hydrocarbon is lower alkyl chlorobenzene.

* * * * *